United States Patent [19]

Oishi et al.

[11] Patent Number: 4,622,618
[45] Date of Patent: Nov. 11, 1986

[54] MAGNETIC RECORDING DISK CARTRIDGE

[75] Inventors: Kengo Oishi; Tuyoshi Ono, both of Odawara, Japan

[73] Assignee: Fuji Photo Film Co., Ltd., Japan

[21] Appl. No.: 539,187

[22] Filed: Oct. 5, 1983

[30] Foreign Application Priority Data

Oct. 6, 1982 [JP] Japan .................. 57-151763[U]

[51] Int. Cl.$^4$ .................. G11B 23/03; G11B 5/10; G11B 5/127; G11B 5/41
[52] U.S. Cl. .................. 360/133; 360/128
[58] Field of Search .................. 360/133, 130.2, 137, 360/128; 206/444, 307; 15/210 R

[56] References Cited

U.S. PATENT DOCUMENTS 3,864,755  2/1975  Hargis .................. 206/387
4,463,849  8/1984  Prusak et al. .................. 206/444
4,470,083  9/1984  Doering et al. .................. 360/128
4,510,546  4/1985  Asami et al. .................. 360/133

FOREIGN PATENT DOCUMENTS 1054533  2/1954  France .................. 206/307

Primary Examiner—Robert S. Tupper
Assistant Examiner—Melissa J. Koval
Attorney, Agent, or Firm—Pasquale A. Razzano

[57] ABSTRACT

A magnetic recording disk cartridge comprises a flat casing and a magnetic recording disk accommodated in the casing. The recording disk is rotated at a high speed when recording and reproducing video signals. An annular unwoven fabric is attached to each of the opposed major inner surfaces of the casing to be opposed to the outer margin of the recording disk.

1 Claim, 2 Drawing Figures

U.S. Patent  Nov. 11, 1986  4,622,618
F I G. I
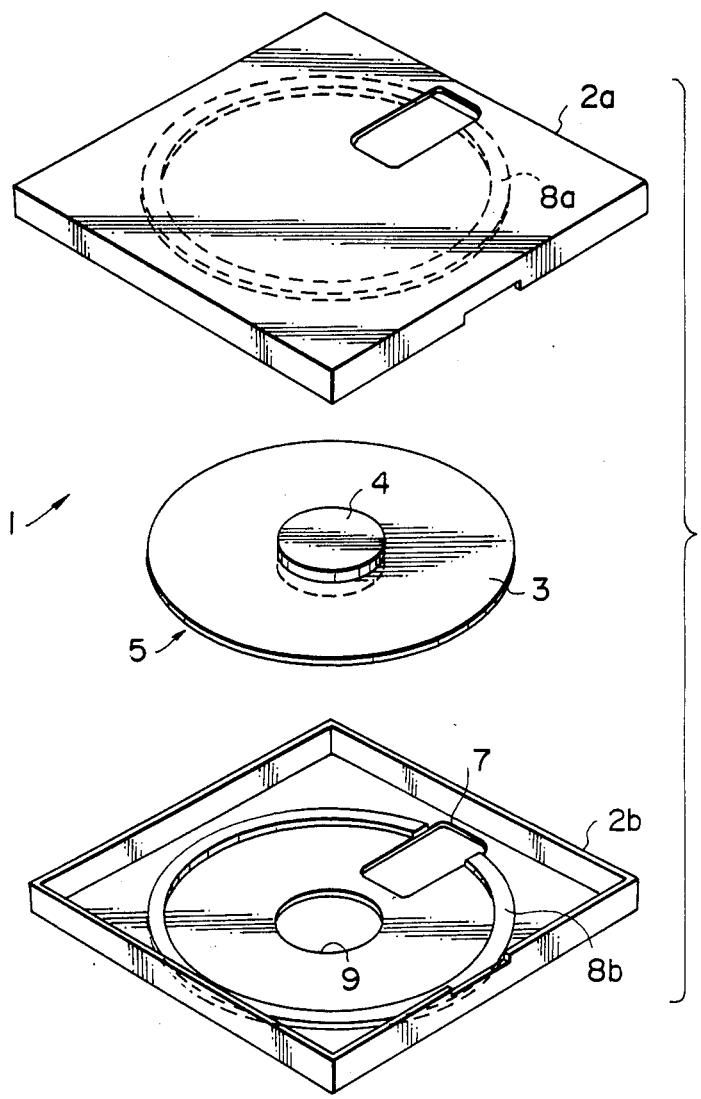
F I G. 2
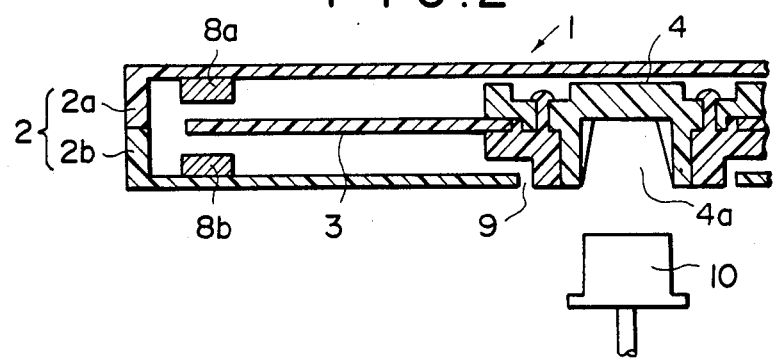

MAGNETIC RECORDING DISK CARTRIDGE

BACKGROUND OF THE INVENTION

1. Field of the Invention

This invention relates to a magnetic recording disk cartridge, and more particularly to a magnetic recording disk cartridge for a magnetic recording disk which is small in diameter and extremely thin in thickness and which is rotated at a high speed when recording and reproducing signals.

2. Description of the Prior Art

There has come into wide use, as a recording medium for computers, a flexible disk of polyester resin coated with magnetic material on both sides thereof, on which digital information is recorded by a magnetic head. This flexible disk, popularly referred to as a "floppy disk", is easy to handle and inexpensive.

Recently, there has been proposed a photographic still camera in which, instead of a conventional silver salt photographic film which cannot be reused, a magnetic recording disk smaller than the floppy disk both in thickness and diameter is used as a recording medium. This still camera is generally referred to as "an electronic camera" and is generally about as large as a typical 35 mm photographic camera. In the electronic camera the image of an object is magnetically recorded on the magnetic recording disk while the disk is rotated at a high speed. Generally the magnetic recording disk for the electronic camera is accommodated in a hard casing to form a cartridge and is loaded in the camera body together with the casing.

Though in the conventional floppy disk, the disk is provided with an engaging hole at its center to be supported on its both sides, the recording disk for the electronic camera is provided with a hub at its center, the hub being adapted to be engaged with a rotational shaft inserted into the cartridge from one side thereof.

In recording images using a magnetic recording medium, since video signals have a wider frequency band than digital signals or audio signals, the signals are densely recorded on the magnetic recording medium. Accordingly, when fine unevenness scratches or flaking exists in the magnetic coating on the magnetic recording medium or fine dust adheres thereto, so-called drop-out occurs during reproduction and the recorded signals cannot be faithfully reproduced. Since the magnetic recording disk cartridge for the electronic camera is frequently used outside, it is normally subjected to vibrations while being carried and the surface of the magnetic coating on the recording disk is apt to come into contact with the inner surface of the hard casing to be scratched thereby. Also, in an outdoor environment fine dust is apt to enter the casing through the magnetic head receiving opening or the hub hole exposing the hub.

There has been proposed in Japanese Utility Model Publication No. 57(1982)-102081 a magnetic recording disk cartridge in which a pad is attached to one of the opposed inner surfaces of the casing. However, this cartridge is mainly directed to preventing the recording medium from being scratched while being carried, and cannot prevent drop-out due to dust.

SUMMARY OF THE INVENTION

In view of the foregoing observations and description, the primary object of the present invention is to provide an improved magnetic recording disk cartridge which can prevent drop-out due to dust even if dust enters the casing and which can prevent the surfaces of the recording medium from being brought into contact with the inner surface of the hard casing to be scratched thereby while the cartridge is subjected to vibrations.

In accordance with the present invention, an annular unwoven fabric is attached to each of the major inner surfaces of the casing to be opposed to the outer margin of the recording disk. The thickness of the unwoven fabrics is selected so that the surfaces of the recording disk does not come into contact with the fabrics while the disk is rotated at a high speed for recording and reproduction.

In the magnetic recording disk cartridge of the present invention, the surfaces of the recording disk cannot come into contact with the inner surfaces of the hard casing since the recording disk is supported by the hub at its center and by the unwoven fabrics at its periphery while the cartridge is at rest or being carried. The unwoven fabrics also serve to trap dust in the casing which is driven toward the outer periphery of the recording disk by centrifugal force when the disk is rotated at a high speed for recording and reproduction, whereby drop-out due to dust can be prevented.

BRIEF DESCRIPTION OF THE DRAWINGS

FIG. 1 is an exploded perspective view of a magnetic recording disk cartridge in accordance with an embodiment of the present invention, and FIG. 2 is fragmentary cross sectional view of the magnetic recording disk cartridge of FIG. 1.

DESCRIPTION OF THE PREFERRED EMBODIMENT

In FIGS. 1 and 2, a magnetic recording disk cartridge 1 in accordance with an embodiment of the present invention comprises a flat casing 2 formed of upper and lower halves 2a and 2b and a magnetic recording disk 5 accommodated in the casing 2. The recording disk 5 comprises a flexible recording medium 3 and a hub 4 fixed to the recording medium 3 at its center. The recording medium 3 is composed of a 50µ or thinner polyester sheet bearing thereon a magnetic recording layer formed, for instance, by coating, evaporating or sputtering a magnetic material thereon. The hub 4 comprises a pair of cylindrical halves secured together to sandwich the recording medium 3 therebetween by ultrasonic welding, for example. In one end surface of the hub 4 is provided an engaging hole 4a into which a rotational shaft 10 of the system which uses the recording disk 5 is inserted to drivingly engage with the hub 4. The lower half 2b of the casing 2 is provided, at the center of its base wall, with a hub opening 9 through which the rotational shaft 10 has access to the engaging hole 4a of the hub 4. The lower half 2b is further provided with a magnetic head receiving opening 7 which is substantially rectangular in shape and extends radially outwardly from the hub opening 9. An annular unwoven fabric 8b is attached to the inner surface of the base wall of the lower half 2b to be opposed to the outer margin of the recording medium 3 on the outer side of the recording region of the recording medium 3. A similar annular unwoven fabric 8a is attached to the inner surface of the base wall of the upper half 2a to be opposed to the unwoven fabric 8b on the lower half 2b. The thickness of the unwoven fabrics 8a and 8b is selected so that the recording disk 5 does not come into contact with the fabrics 8a and 8b when the disk 5 is rotated at a high speed. For example, when the space between the inner surfaces of the base walls of the upper and lower halves 2a and 2b is 1 mm and the thickness of the recording medium 3 is 50$\mu$, the thickness of each unwoven fabric may be 200$\mu$ and the thickness of the adhesive layers between the unwoven fabrics and the respective base walls may be 100$\mu$ with the distance between each unwoven fabric and the opposed surface of the recording medium 3 being 175$\mu$. The unwoven fabrics 8a and 8b may be formed of synthetic fibers such as nylon or polyester.

The unwoven fabrics 8a and 8b prevent the surfaces of the recording medium 3 from coming into contact with the hard inner surface of the casing 2 when the recording disk 5 is at rest or when the cartridge is carried. Further, when the recording disk 5 is rotated at a high speed for recording or reproduction, dust in the casing 2 is driven toward the peripheral edge of the recording disk 5 by centrifugal force and is trapped by the unwoven fabrics 8a and 8b.

What is claimed:

1. A magnetic recording disk cartridge comprising a recording disk having a hub at its center, a recording surface thereon, and terminating at an outer margin, and a flat casing for accommodating therein the recording disk, the casing having a pair of opposed major wall portions having inner surfaces extending substantially in parallel to the recording surface of the recording disk, the recording disk being adapted to be rotated at a high speed in the casing during recording and reproduction, wherein the improvement comprises a pair of generally annular unwoven fabric rings having predetermined thicknesses and being respectively mounted to the inner surface of said major wall portions of the casing and extending inwardly therefrom, said rings each having an inner face respectively opposed to the opposite sides of the outer margin of the recording disk, with the thickness of the unwoven fabric rings being selected so that said inner faces of said rings are spaced from the outer margin of the recording disk while the disk is rotated at high speed and prevent the recording surface from coming into contact with said inner surfaces when the recording disk is at rest.

* * * * *